US006321077B1

United States Patent
Saitoh et al.

(10) Patent No.: US 6,321,077 B1
(45) Date of Patent: Nov. 20, 2001

(54) RECEPTION CONTROL SYSTEM FOR AUTOMOBILE

(75) Inventors: Masatoshi Saitoh, Machida; Hiroyuki Tachihara, Inzai; Hidemichi Inoue, Inagi, all of (JP); Richard Langley, Chartham Hatch; David Briggs, Worcestershire, both of (GB)

(73) Assignee: Harada Industry Co., Ltd., Tokyo (JP)

( * ) Notice: Subject to any disclaimer, the term of this patent is extended or adjusted under 35 U.S.C. 154(b) by 0 days.

(21) Appl. No.: 09/299,086

(22) Filed: Apr. 23, 1999

(30) Foreign Application Priority Data

Apr. 24, 1998 (JP) .................................................. 10-115386

(51) Int. Cl.⁷ ...................................................... H04Q 7/20
(52) U.S. Cl. .................... 455/345; 455/191.1; 455/193.1
(58) Field of Search ..................................... 455/345, 274, 455/275, 276.1, 277.1, 191.1, 193.1, 38.5, 66, 142, 180.1, 188.1, 344; 343/713, 717, 715, 711, 725, 742, 704; 348/706, 705, 729, 731, 554, 558; 370/338

(56) References Cited

U.S. PATENT DOCUMENTS 6,043,783 * 3/2000 Endo et al. .......................... 343/713

* cited by examiner

*Primary Examiner*—Nay Maung
*Assistant Examiner*—Jean A. Gelin
(74) *Attorney, Agent, or Firm*—Pennie & Edmonds LLP

(57) ABSTRACT

A reception control system for automobiles according to the present invention includes tuners for a plurality of receivers for receiving various types of waves including at least an AM/FM broadcast wave, a TV broadcast wave and a GPS wave. The tuners are separated from receiver bodies and integrally incorporated into an antenna section (a plurality of antenna elements+an AM/FM reception circuit+a TV reception circuit) including at least a plurality of antenna elements. The tuners are supplied with a digital control signal through a LAN provided in an automobile thereby to control reception of waves.

7 Claims, 3 Drawing Sheets

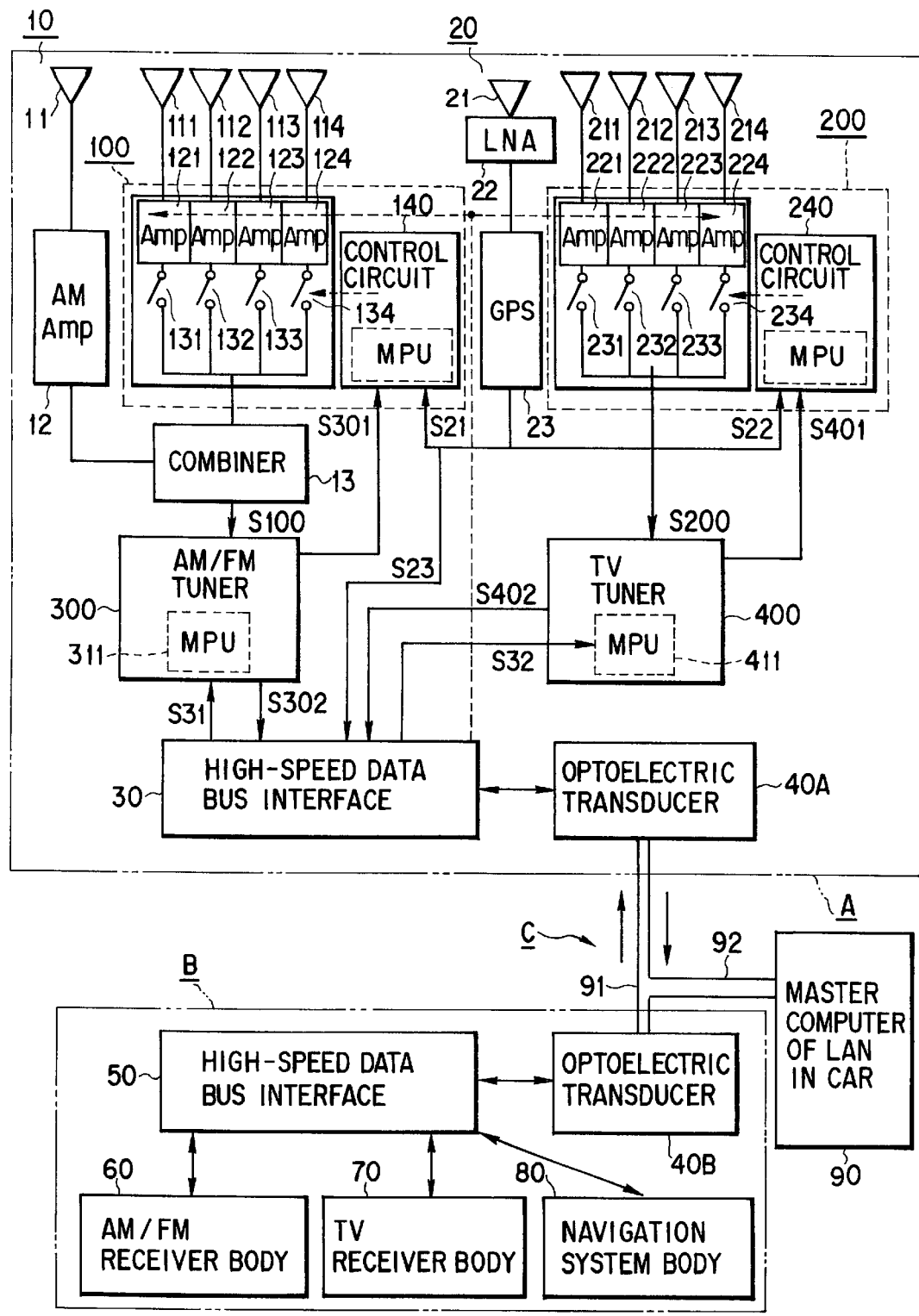
F I G. 1

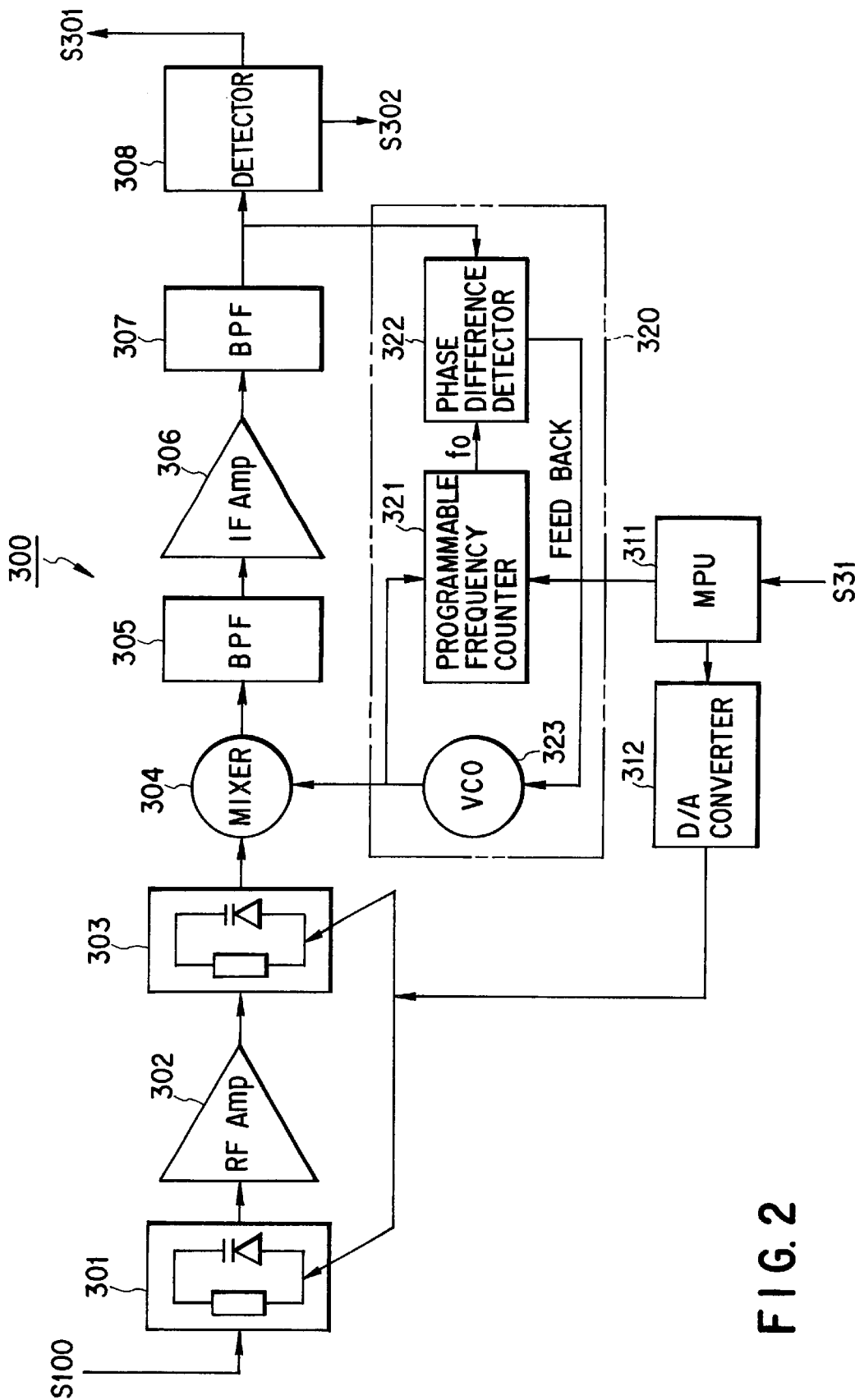
F I G. 2

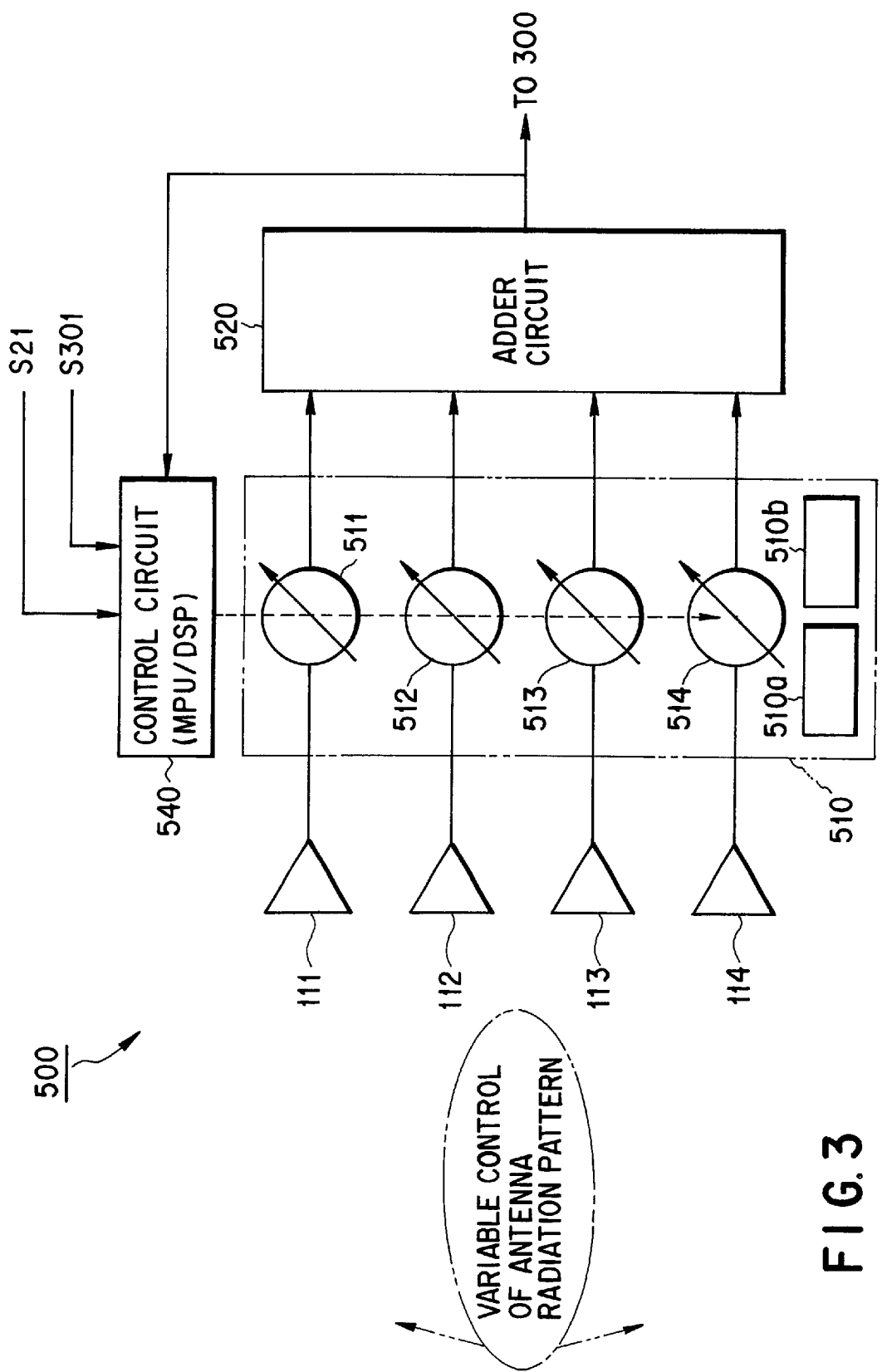
F I G. 3

RECEPTION CONTROL SYSTEM FOR AUTOMOBILE

BACKGROUND OF THE INVENTION

The present invention relates to a reception control system for automobiles having a plurality of receivers for receiving various types of waves such as an AM/FM broadcast wave, a TV broadcast wave and a GPS wave.

Conventionally various reception control systems have been proposed for automobiles. One system has an antenna section including a plurality of windowpane antenna elements of strip conductors and provided in the rear of an automobile and an AM/FM receiver or a TV receiver mounted on a dashboard of the automobile. The antenna section and the AM/FM or TV receiver are connected by means of a plurality of coaxial cables.

The above system has a problem of complicating a wiring operation and increasing in manufacturing costs because the plural coaxial cables are used to connect the antenna section and the AM/FM receiver or TV receiver. The system also has a problem of decreasing in reception performance because noise is likely to enter the system through the coaxial cables.

BRIEF SUMMARY OF THE INVENTION

An object of the present invention is to provide a reception control system for automobiles having the following advantages.

1) A signal transmission path (transmission cable) for connecting an antenna section and an AM/FM receiver or a TV receiver can be simplified and thus its wiring operation can easily be performed at low cost.

2) No noise is likely to enter the system through the signal transmission path; therefore, the system can receive waves satisfactorily.

In order to attain the above object, a reception control system for automobiles according to the present invention has the following characteristic constitution. The other characteristic constitution of the present invention will be clarified in the Description of the Invention.

The reception control system for automobiles comprises tuners for a plurality of receivers for receiving various types of waves including at least an AM/FM broadcast wave, a TV broadcast wave and a GPS wave, the tuners being separated from receiver bodies and integrally incorporated into an antenna section including at least a plurality of antenna elements, and the tuners being supplied with a digital control signal through a LAN provided in an automobile thereby to control reception of waves.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a constitution of a reception control system for automobiles according to a first embodiment of the present invention;

FIG. 2 is a block diagram showing in detail a constitution of an AM/FM tuner of the reception control system of FIG. 1; and FIG. 3 is a block diagram depicting a constitution of a reception circuit having a beam steering function which is used as an FM reception circuit and a TV reception circuit of a reception control system for automobiles according to a second embodiment of the present invention.

DETAILED DESCRIPTION OF THE INVENTION (First Embodiment)

FIG. 1 is a block diagram showing a constitution of a reception control system for automobiles according to a first embodiment of the present invention. The reception control system includes an antenna section A shown in the upper part of FIG. 1 and a receiver section B shown in the lower part thereof. The antenna section A and receiver section B are connected to each other by a signal transmission path C.

The antenna section A includes a plurality of reception circuits such as an AM reception circuit 10, a GPS reception circuit 20, an FM·4ch diversity reception circuit 100 serving as an FM reception circuit, and a TV·4ch diversity reception circuit 200 serving as a TV reception circuit. An AM/FM tuner 300 separated from an AM/FM receiver body 60 of the receiver section B and a TV tuner 400 separated from a TV receiver body 70 thereof are incorporated into the antenna section A integrally as one unit. The antenna section A also includes a high-speed data bus interface 30 and an optoelectric transducer 40A to exchange signals between the sections A and B.

The AM reception circuit 10 includes a windowpane antenna element 11 and an amplifier 12. The GPS reception circuit 20 includes a windowpane antenna element 21, a low-noise amplifier 22 provided near the element 21, and a GPS engine (small-sized receiver) 23. The GPS reception circuit 20 is capable of acquiring measurement information such as positional information, velocity information, and direction information.

The FM·4ch diversity reception circuit 100 includes four amplifiers 121 to 124 for amplifying signals supplied from their respective windowpane antenna elements 111 to 114, four selective switches 131 to 134 for selecting one among from the amplified signals, and a control circuit 140 for controlling ON/OFF states of the selective switches 131 to 134.

The control circuit 140 employs a microcomputer MPU and operates in response to a feedback signal S301 from the AM/FM tuner 300, which will be described later, and a signal S21 from the GPS reception circuit 20.

The output signal of the AM reception circuit 10 and that of the FM·4ch diversity reception circuit 100 are combined into a signal S100 by a combiner 13, and the signal S100 is input to the AM/FM tuner 300.

The TV·4ch diversity reception circuit 200 includes four amplifiers 221 to 224 for amplifying signals supplied from their respective windowpane antenna elements 211 to 214, four selective switches 231 to 234 for selecting one among from the amplified signals, and a control circuit 240 for controlling ON/OFF states of the selective switches 231 to 234. The control circuit 240 employs a microcomputer MPU and operates in response to a feedback signal S401 from the TV tuner 400, which will be described later, and a signal S22 from the GPS reception circuit 20.

A signal S200 is output from the TV·4ch diversity reception circuit 200 and input to the TV tuner 400.

The AM/FM tuner 300 and TV tuner 400 are controlled by their respective slave computers (sub-brains) MPU 311 and 411 included therein.

FIG. 2 is a block diagram showing in detail a constitution of the AM/FM tuner 300. As indicated by an arrow on the left-hand side of FIG. 2, the output signal S100 of the combiner 13 is supplied to a tuning circuit (resonator) 301 constituted of an induction coil and a variable-capacitance diode and tuned. The tuned signal is amplified by an RF amplifier 302 and tuned again by another tuning circuit (resonator) 303. The tuned signal is supplied to a mixer 304 to be mixed with an output signal of a voltage control oscillation circuit 323, which will be described later. The mixed signal is sent to an intermediate-frequency amplifier 306 through a band-pass filter 305 and amplified therein. The amplified signal is supplied to a detector 308 through another band-pass filter 307, and detected and demodulated. On one hand the demodulated FM intermediate-frequency signal is fed back to the control circuit 140 as a feedback signal S301; on the other hand, it is supplied to the high-speed data bus interface 30 as a reception signal S302.

As indicated by an arrow on the lower part of FIG. 2, a signal S31 is output from the high-speed data bus interface 30 and then input to the microprocessor (MPU) 311 as a slave (sub-brain) computer. On one hand an output signal of the microprocessor 311 is converted to an analog signal by a D/A converter 312 and the analog signal is supplied to a variable-capacitance diode of the tuning circuit (resonator) 301, 303 as a tuned voltage; on the other hand, it is supplied to a programmable frequency counter 321 of a phase-locked loop 320 as a preset signal of parameter [N/P]. One input terminal of a phase difference detector 322 is supplied with an output $f_o$ of the programmable frequency counter 321, while the other input terminal thereof is supplied with the signal sent from the band-pass filter 307. The phase difference detector 322 detects a phase difference signal and supplies it to the voltage control oscillation circuit 323. The circuit 323 outputs a signal to the mixer 304 and feeds it back to the programmable frequency counter 321.

Return to FIG. 1. Since the structure of the TV tuner 400 is basically the same as that of the AM/FM tuner 300 illustrated in FIG. 2, its concrete description is omitted. The high-speed data bus interface 30 employs a DSP (digital signal processor) and receives the reception signal S302 from the AM/FM tuner 300, a reception signal S402 from the TV tuner 400, and a signal S23 from the GPS reception circuit 20 and supplies them to the optoelectric transducer 40A. The interface 30 also supplies signals S31 and S32 from the optoelectric transducer 40A to the microprocessor (MPU) 311 of the AM/FM tuner 300 and the microprocessor (MUP) 411 of the TV tuner 400, respectively.

The optoelectric transducer 40A converts an electrical signal, which is supplied from the high-speed data bus interface 30, into an optical signal and sends it to the receiver section B through the signal transmission path C constituted of optical fibers. The optoelectric transducer 40A also converts an optical signal, which is transmitted from the receiver section B through the signal transmission path C, into an electrical signal and sends it to the high-speed data bus interface 30.

The constitution of the receiver section B will now be described.

An optoelectric transducer 40B converts an optical signal, which is transmitted from the antenna section A through the signal transmission path C, into an electrical signal and sends it to a high-speed data bus interface 50. The optoelectric transducer 40B also converts an electrical signal, which is supplied from the high-speed data bus interface 50, into an optical signal and sends it to the antenna section A through the transmission path C.

The high-speed data bus interface 50 employs a DPS (digital signal processor) to exchange signals with the AM/FM receiver body 60, TV receiver body 70, navigation system body 80 and optoelectric transducer 40B.

The AM/FM receiver body 60 and TV receiver body 70 are each constituted of elements such as a switch, a speaker and a display, excluding a tuner or the like. These receiver bodies 60 and 70 are supplied with AM/FM and TV reception signals, which are received by the antenna section A and tuned, to allow a listener to listen to AM/FM broadcast programs and allow a viewer to watch TV broadcast programs.

The navigation system body 80 has a known constitution and notifies a user of destination guide information on the basis of GPS measurement information supplied from the GPS reception circuit 20 of the antenna section A.

The signal transmission path C for connecting the antenna section A and receiver section B is constituted of optical transmission cables 91 using an optical fiber which is part of a signal transmission path of a LAN provided in an automobile. The cables 91 are connected to a master computer 90 of the LAN via an optical transmission cable 92 for coupling.

The system having the above constitution operates as follows. The AM broadcast wave received by the windowpane antenna element 11 is amplified by the amplifier 12 and input to the AM/FM tuner 300 through the combiner 13. The signal tuned in the tuner 300 is supplied to the optoelectric transducer 40A via the high-speed data bus interface 30 and converted into an optical signal. The optical signal is then transmitted to the receiver section B through the signal transmission path C. The optical signal containing information of AM broadcast, which is sent to the receiver section B, is converted again into an electrical signal by the optoelectric transducer 40B, and supplied to the AM/FM receiver body 60 via the high-speed data bus interface 50. Since, therefore, the AM broadcast is output as an acoustic signal, a user can listen to the AM broadcast.

The FM broadcast waves received by the windowpane antenna elements 111 to 114 are supplied to the AM/FM tuner 300 via the FM·4ch diversity reception circuit 100 and combiner 13 and tuned therein. The tuned waves are output as FM intermediate frequency signals. Some of the FM intermediate frequency signals are input as a feedback signal S301 to the control circuit 140 of the FM·4ch diversity reception circuit 100, together with the measured-information signal S21 output from the GPS reception circuit 20. The control circuit 140 therefore operates to selectively control the ON/OFF states of the 4ch switches 131 to 134 based on input information. Thus, so-called diversity reception is performed. The reception signal S302, which is subjected to diversity reception processing and then tuned by the AM/FM tuner 300, is supplied to the optoelectric transducer 40A through the high-speed data bus interface 30. After that, like the AM reception signal, the reception signal S302 is sent to the receiver section B and input to the AM/FM receiver body 60. Since, therefore, the FM broadcast is output as an acoustic signal, a user can listen to the FM broadcast.

The TV broadcast waves received by the windowpane antenna elements 211 to 214 are supplied to the TV tuner 400 via the TV·4ch diversity reception circuit 200 and tuned therein. The tuned waves are output as video signals. Some of the video signals are input as a feedback signal S401 to the control circuit 240 of the FM·4ch diversity reception circuit 200, together with the measured-information signal S22 output from the GPS reception circuit 20. The control circuit 240 therefore operates to selectively control the ON/OFF states of the 4ch switches 231 to 234 based on input information. Thus, so-called diversity reception is performed. The reception signal S402, which is subjected to diversity reception processing and then tuned by the TV tuner 400, is supplied to the optoelectric transducer 40A through the high-speed data bus interface 30. After that, like the FM reception signal, the reception signal S402 is sent to the receiver section B and input to the TV receiver body 70. Since, therefore, the TV broadcast is output as an acoustic signal, a user can watch the TV broadcast.

The GPS wave received by the windowpane antenna element 21 is amplified by the low-noise amplifier 22 and then processed by the GPS engine 23 into a measurement information signal. This signal is partly supplied as a reception signal S23 to the optoelectric transducer 40A through the high-speed data bus interface 30. After that, like the above reception signals, the signal S23 is sent to the receiver section B and input to the navigation system body 80. Thus, a user is notified of information for guiding a user's automobile to his or her destination, based on information such as a running position, a running speed and a running direction of the automobile.

(Second Embodiment)

FIG. 3 is a block diagram depicting a constitution of a reception circuit having a beam steering function which is used as an FM reception circuit and a TV reception circuit of a reception control system for automobiles according to a second embodiment of the present invention. The reception circuit is employed in place of the FM·4ch diversity reception circuit 100 and TV·4ch diversity reception circuit 200 of the first embodiment. However, FIG. 3 shows only the FM reception circuit 500 which is used in place of the FM·4ch diversity reception circuit 100 of the first embodiment.

The FM reception circuit 500 is designed for control of a next-generation antenna and so constituted that antenna elements 111 to 114 have a "beam steering" function.

Variable control circuits 511 to 514 of a gain and phase variable control device 510 are connected to their respective antenna elements 111 to 114. The device 510 includes an antenna element selecting means 510a for selecting one from the antenna elements based on information about antenna directivity and a phase relationship setting means 510b for variably setting a relationship in phase between waves received by the selected antenna elements.

The output signals of the gain and phase variable control circuits 511 to 514 are added (mixed) together by an adder circuit (mixer) 520, and the added signal is supplied to an AM/FM tuner 300 and a control circuit 540. The control circuit 540 employs a microprocessor (MPU) or a digital signal processor (DSP) and receives a measurement information signal S21 from the GPS reception circuit 20 and a feedback signal S301 from the AM/FM tuner 300. The control circuit 540 thus acquires information as to which directivity an antenna should be set in sequence on the basis of the present-position information of an automobile and the originating position information of a received wave, and controls the gain and phase variable control circuits 511 to 514 based on the information acquired in sequence. Thus, the FM reception circuit 500 of the second embodiment substantially variably controls an overall radiation pattern of the antenna elements 111 to 114, and a so-called beam steering operation can be performed without driving the antenna elements.

In the foregoing second embodiment, a combined function of the original diversity reception function and the beam steering function can be fulfilled.

(Modifications)

The reception control system for automobiles according to the embodiments can be modified as follows:

i) The modified system includes a key-less door lock control system. In this case, an antenna element and a tuner section of the key-less door lock control system are incorporated into the antenna section A.

ii) The number of antenna elements illustrated in FIG. 3 is larger than five.

(Features of the Embodiments)

[1] A reception control system for automobiles according to the above embodiments comprises tuners (300, 400) for a plurality of receivers for receiving various types of waves including at least an AM/FM broadcast wave, a TV broadcast wave and a GPS wave. The tuners (300, 400) are separated from receiver bodies (60, 70) and integrally incorporated into an antenna section (a plurality of antenna elements+an AM/FM reception circuit+a TV reception circuit) including at least a plurality of antenna elements (11, 111--114, 211-214). The tuners are supplied with a digital control signal through a LAN (91, 92) provided in an automobile thereby to control reception of waves.

In the foregoing system, since the tuners (300, 400) are separated from the receiver bodies (60, 70) and incorporated into the antenna section (A), the receiver bodies, which are provided on a dashboard of an automobile, can be lightened, and the number of cables of a signal transmission path connecting the receiver bodies (60, 70) and antenna section (A) can be reduced. Since, moreover, a signal transmission path of the LAN (91, 92) is used, its wiring is simplified and decreased in manufacturing costs. The signal transmission line is connected to a central nervous network of an automobile, and the tuners include a slave computer; therefore, the system is ready for being adapted to an ITS (Intelligent Transport System) in the near future.

[2] In the reception control system as described in the above paragraph [1], the plurality of antenna elements are windowpane antenna elements (11, 111–114, 211–214) constituted of strip conductors adhered to a rear windowpane of the automobile.

[3] In the reception control system as described in above paragraph [1], the signal transmission path (C) of the LAN is formed of optical fibers (91, 92).

This system has the same operation and effect as those of the system described in the paragraph [1]. Since, moreover, the signal transmission path (C) is formed of the optical fibers (91, 92), noise due to electromagnetic induction is unlikely to enter the system through the signal transmission path (C); consequently, low-noise waves can be received satisfactorily.

[4] In the reception control system as described in above paragraph [1], at least one of the FM broadcast wave and the TV broadcast wave is received by a diversity reception system.

[5] In the reception control system as described in above paragraph [1], the tuners (300, 400) of the antenna section (A) are controlled by slave computers (311, 411).

This system has the same operation and effect as those of the system described in the paragraph [1] and the fundamental capability of achieving the latest antenna control such as beam steering. Since information (various conditions requested by a driver) can be obtained from the receiver body, pre-tuning (sensitivity, channel setting) of the antenna amplifier can be done to prevent an interference and thus improve in reception efficiency.

[6] In the reception control system as described in above paragraph [1], the tuners (300, 400) are integrally incorporated into the antenna section (A) as one unit.

This system has the same operation and effect as those of the system described in the paragraph [1], and the tuners (300, 400) can easily be replaced when they are troubled.

[7] In the reception control system as described in above paragraph [1], at least one of the FM reception circuit for receiving an FM broadcast wave and the TV reception circuit for receiving a TV broadcast wave is a reception circuit (500) having a beam steering function.

This system has the same operation and effect as those of the system described in the paragraph [1], and an overall radiation pattern of the antenna elements (111 to 114) can be substantially variably controlled by electronic control. In other words, a so-called beam steering operation can be performed without actually varying the positions of the antenna elements. Especially, in the reception circuit (500) of the second embodiment, a combined function of the original diversity reception function and the beam steering function can be fulfilled.

[8] In the reception control system as described in above paragraph [7], the reception circuit (500) having a beam steering function comprises a gain and phase variable control circuit (510) including an antenna element selecting means (510a) for selecting one from the antenna elements based on information about antenna directivity and a phase relationship setting means (510b) for variably setting a relationship in phase between waves received by the selected antenna elements.

[9] The reception control system according to the embodiments is obtained by properly combining the features described in above paragraphs [1] to [8] and adding the above modifications to the features.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reception control system for automobiles comprising:
   an antenna section having a plurality of windowpane antenna elements comprised of strip conductors adhered to a windowpane of an automobile for receiving various types of waves including at least an AM/FM broadcast wave, a TV broadcast wave, and a GPS wave;
   a plurality of receiver bodies including an AM/FM broadcast receiver body and a TV broadcast receiver body arranged inside said automobile to respectively correspond with said various types of waves received by said plurality of windowpane antenna elements;
   a plurality of tuners respectively separated from at least said AM/FM broadcast receiver body and the TV broadcast body, said plurality of tuners being integrally incorporated into said antenna section for tuning at least said AM/FM broadcast wave, and said TV broadcast wave of the various types of waves; and
   a plurality of microprocessors for controlling reception by supplying a digital control signal, which is transmitted through a LAN provided in the automobile, to said plurality of tuners, respectively.

2. A reception control system according to claim 1, wherein the signal transmission path of the LAN is formed of optical fibers.

3. A reception control system according to claim 1, wherein at least one of the FM broadcast wave and the TV broadcast wave is received by a diversity reception system.

4. A reception control system according to claim 1, wherein the plurality of microprocessors are employed as slave computers.

5. A reception control system according to claim 1, wherein the tuners are integrally incorporated into the antenna section as one unit.

6. A reception control system according to claim 1, wherein at least one of an FM reception circuit for receiving the FM broadcast wave and a TV reception circuit for receiving the TV broadcast wave is a reception circuit having a beam steering function.

7. A reception control system according to claim 6, wherein a reception circuit having a beam steering function comprises a gain and phase variable control circuit including an antenna element selecting means for selecting one from the antenna elements based on information about antenna directivity and a phase relationship setting means for variably setting a relationship in phase between waves received by the selected antenna elements.

* * * * *